United States Patent

[11] 3,589,532

[72] Inventor Harlan J. Filkins
 7531 Blakely Drive N. E., Rockford, Mich. 49341
[21] Appl. No. 835,364
[22] Filed June 23, 1969
[45] Patented June 29, 1971

[54] PLANAR ARTICLE INVERTER
 12 Claims, 5 Drawing Figs.
[52] U.S. Cl. ............................................................ 214/1 QA
[51] Int. Cl. ................................................................ B65g 47/24
[50] Field of Search ........................................... 214/1, 1 R, 1 R7, 1 RA

[56] References Cited
UNITED STATES PATENTS

| | | | |
|---|---|---|---|
| 2,514,190 | 7/1950 | Schlichter et al. | 214/1 (RA) |
| 2,829,759 | 4/1958 | Parker | 214/1 RA UX |
| 2,981,420 | 4/1961 | Johanson | 214/1 RA UX |
| 3,002,326 | 10/1961 | Carter et al. | 214/1 R UX |
| 3,049,243 | 8/1962 | Buice | 214/1 (SWB) |
| 3,112,829 | 12/1963 | Modder | 214/1 (RT) |
| 3,319,804 | 5/1967 | Beatty et al. | 214/1 (RT) |

FOREIGN PATENTS

| | | | |
|---|---|---|---|
| 751,303 | 6/1956 | Great Britain | 214/1 (RA) |

Primary Examiner—Gerald M. Forlenza
Assistant Examiner—Frank E. Werner
Attorney—Price, Heneveld, Huizenga & Cooper ABSTRACT: This disclosure relates to an apparatus for inverting planar articles such as tabletops wherein the articles can be suitably rotated about an edge thereof without damage to the edge. The apparatus contains a pair of platforms in coplanar horizontal relationship and joined therebetween by an abutment which is moved downwardly, thereby rotating the platforms toward the vertical. A planar article, supported by one of the platforms and in contact with the abutment, is raised from a horizontal to a vertical position by the platform and rotated about its edge until it is in contact with and partially supported by the other platform.

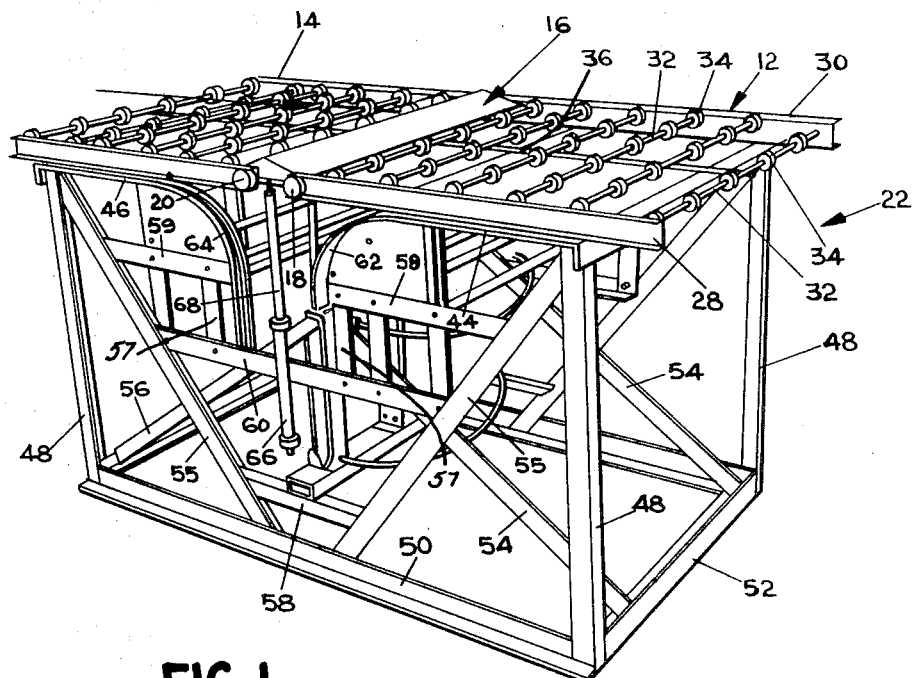

INVENTOR.
HARLAN J. FILKINS
BY
ATTORNEYS

PLANAR ARTICLE INVERTER

This invention relates to inverting of planar articles such as tabletops. In one of its aspects it relates to an inverter comprising a platform, an abutment rising above the plane of the platform and joined at one side thereto, and means for moving the abutment downwardly and thereby rotating the platform from a horizontal to a vertical position.

In the manufacture of table tops and the like, it has been customary to laminate plastic or wood veneer to a pressed wood core. The veneer layer usually extends over the edges of the wood core to make sure that it covers the entire top and bottom surfaces. It then becomes necessary to cut off the extra portion of the veneer layer extending out beyond the edge of the wood core. Such an operation is known as "edging." Usually a router tool is used to cut around the top edge of the wood core and remove the excess veneer layer. The tabletop must then be inverted so that the same operation can be carried out on the bottom edge.

The wood cores are quite heavy, weighing as much as 400 pounds for some large table tops. Normally, they weigh 50 to 100 pounds for the smaller ones. It is necessary to use manual labor to invert the tabletops. This operation is time consuming as well as physically taxing on the operators. Occasionally three or four people must be used to invert a single tabletop.

In the inverting operation it is necessary that the tabletop be lifted free of its edges. If a tabletop is rotated about its edge on a normal surface, the plastic on the edge will chip and break, occasionally to such an extent that the plastic on the edge of the wood core is broken off. This means that the tabletop is defective and unsuitable for normal sale.

I have now discovered a device for inverting tabletops and the like wherein the top can be simply, quickly, and easily rotated about an edge without breaking or chipping of laminated layers extending therefrom.

By various aspects of this invention one or more of the following, or other, objects can be obtained.

It is an object of this invention to provide an apparatus for inverting heavy tabletops and the like without breaking a laminate edge even though it extends beyond the edge of the core.

It is a further object of this invention to provide a simple apparatus for quickly and easily inverting tabletops without physical exertion of manual labor.

It is a further object of this invention to provide a completely automated apparatus for inverting planar articles such as tabletops.

Other aspects, objects, and the several advantages of this invention are apparent to one skilled in the art from a study of this disclosure, the drawings, and the appended claims.

According to the invention there is provided an apparatus for inverting planar articles wherein the articles are inverted while protecting the edges thereof from damage. The apparatus comprises first and second platforms in coplanar and substantially horizontal relationship. Abutment means extends above the general plane of the top surface of the platforms and is rotatably coupled to each of the first and second platforms therebetween. Means are provided for selectively depressing the abutment means and thereby depressing one end of each of the platforms to such an extent that a planar article on the first platform having one edge in contact with the abutment will be raised on the edge and transferred to the second platform, whereby when the abutment means is returned to its original position, and the platforms return to their coplanar relationship, the planar article will be supported by the second platform in an inverted position.

The invention will now be described with reference to the accompanying drawings in which:

FIG. 1 is a side perspective view of an apparatus according to the invention;

FIG. 2 is a front elevational view of the apparatus shown in FIG. 1;

Figure 3:
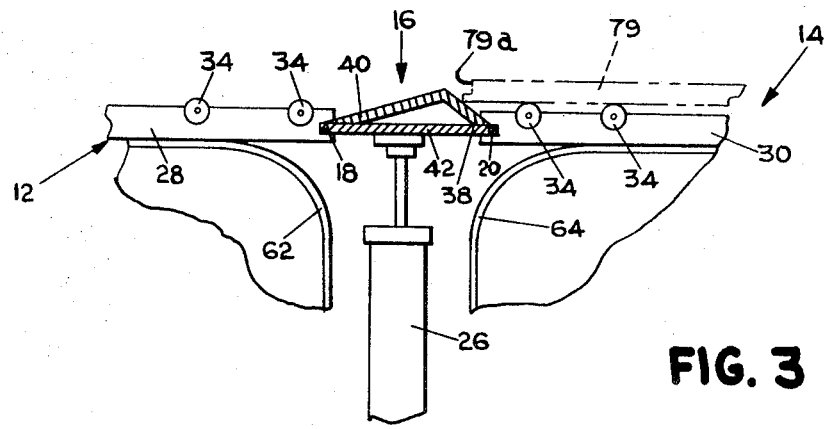
FIG. 3 is a side elevational view in section taken along lines III—III of FIG. 2.
Figure 4:
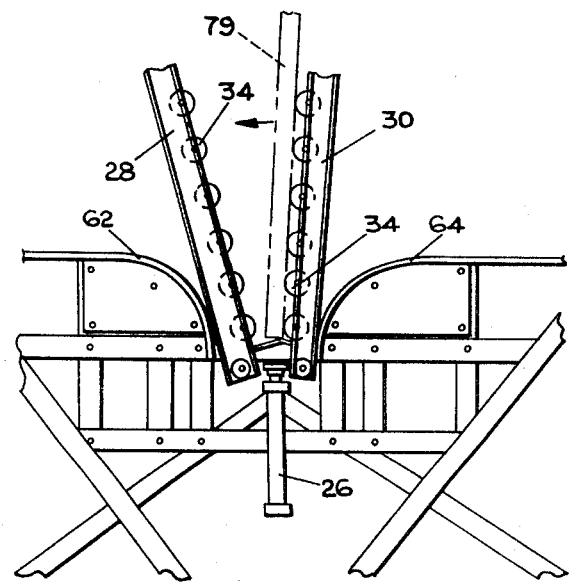
FIG. 4 is a view similar to FIG. 3 illustrating the operation of the apparatus.

Referring now to the drawings and to FIGS. 1 through 3 in particular, there is shown a table top inverter comprising platforms 12 and 14 and an abutment 16 positioned therebetween and rotatably coupled to each of the platforms through pins 18 and 20. The platforms are supported on a base 22. Fluid cylinders 24 and 26 are fixed to the base and join to the abutment 16 for depressing the same thereby rotating the platform upwardly as illustrated in FIG. 4.

Each of the platforms 12 and 14 are comprised of side member 28 and 30 having axles 32 extending therebetween. Wheels 34 are rotatably supported by the axles 32 and extend above the general plane of the side members 28 and 30 thereby providing a supporting surface for planar articles such as tabletops. A central support rod 36 is provided in a longitudinal direction on each of the platforms to stabilize the axles.

The abutment 16 is formed from a forward inclined surface 38, a rear inclined surface 40 and a bottom plate 42. The two inclined surfaces form a peak which rises above the general plane of the top of the platforms 12 and 14.

The platforms are supported on a base 22 which is formed from a plurality of structural members. Top support guides 44 and 46 are in direct contact with the bottom of the side members 28 and 30 of the platforms 12 and 14 respectively. Uprights 48 are joined to the top support guides 44 and to bottom braces 50 and 52. Crossmembers 54 are joined to top portions of fluid cylinders 24 and 26, and to bottom brace 52. Crossmembers 56 are joined at one end to fluid cylinders 24 and 26 from an opposite side of the base and at the other end to an opposite bottom brace 52. Cross braces 55 are joined to the bottom brace 50 and to the top support guides 44 and 46. Side braces 58 and 60 are joined to the cross braces 55. Upright members 57 and crossmembers 59 rigidify rounded central portions 62 and 64 of support guides 44 and 46. Upright members 57 are joined to side braces 60 and to cross members 59. Crossmembers 59 are in turn joined to the rounded portions 62 and 64 and to crossmembers 55.

A stabilizer cylinder 66 is fixed to the side brace 60 and an extendible rod 68 is fixed to the bottom plate 42 of the abutment 16 to stabilize the same. The base structure has been described with relation to one side thereof but it is to be understood that the other side is a mirror image of that described.

The fluid cylinders 24 and 26 are supported by a support member 70 which is joined to cross braces 58. The cylinders have piston rods which extend upwardly and are joined to bottom plate 42.

A hydraulic cylinder 72, having a piston rod 74, is also supported on support member 70. The upper part of the piston rod 74 is joined to the bottom of bottom plate 42. The cylinder 72 has a fluid line 76 extending from a bottom portion to a top portion thereof. A valve 78 is in the fluid line 76 to control the flow of fluid therethrough.

Figure 5:
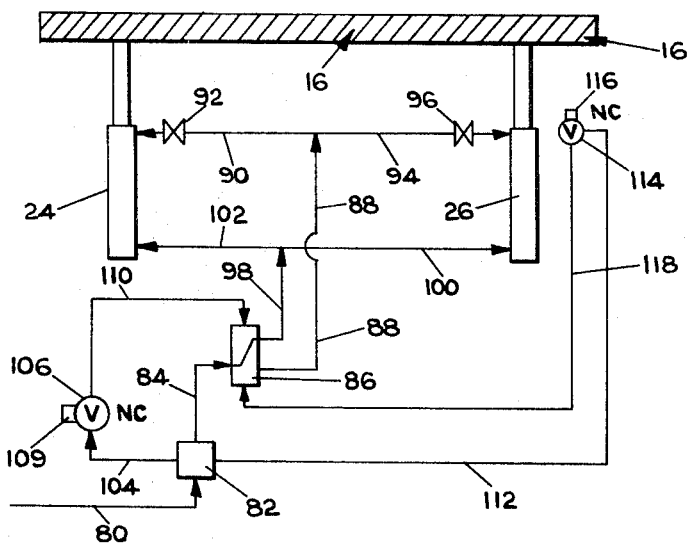
FIG. 5 is a schematic representation of a control system used on the apparatus illustrated in FIGS. 1 through 4.

Referring now specifically to FIG. 5, the control system comprises a fluid pressure or air pressure line 80 which communicates with a distributor 82 to pass air therethrough, through line 84 to valve 86. The air pressure then passes through line 98 to branch 102 and branch 100 to the bottom portion of cylinders 24 and 26 respectively. Alternately, the air pressure is passed through line 88 to branch 90 and 94 into the top portion of the fluid cylinders 24 and 26. An adjustable valve 92 is positioned within line 90 to control the rate at which the air flows therethrough, and an adjustable valve 96 is positioned in branch 94 to control the flow of air through that line.

Pressurized air in distributor 82 also passes through line 112 through normally closed valve 114, line 118 and into a control end of the valve 86. An actuator 116 operates to open valve 114 upon the movement of the abutment downwardly to contact the actuator 116.

Pressurized air in distributor 82 also passes into line 104 through normally closed valve 106 and through line 110 to an opposite control end of valve 86. An actuator button 108 controls the opening of valve 106. The control button 108 can be a starter button as illustrated in FIG. 2, or can be other actuation means such as an electrical contact. For example, the forward inclined surface 38 can have a pressure sensitive electrical tape or other suitable mechanical actuating device thereon such that the contacting of the forward inclined surface 38 will open the valve 106 to permit the pressurized air to pass therethrough.

The valve 86 is an air actuated, toggle valve of conventional construction wherein a spool (not shown) within the valve communicates line 84 with either line 88 or 98. Line 84 communicates with line 88 when air pressure is admitted through line 110 to the one end of the valve to move the spool away from that one end. Alternately, when air passes through line 118 and to the other end of the valve, the spool moves to the first mentioned end to communicate line 84 with line 98.

In operation, a planar article such as a tabletop 79 is positioned on platform 14 and moves in the direction of the arrow illustrated in FIG. 1 until an edge of the tabletop contacts the forward inclined surface 38 of abutment 16. At that point, an operator will push the actuator button 108 to open the normally closed valve 106 permitting air pressure to pass through line 104, valve 106 and line 110 to the one end of valve 86. Alternately, the actuator button 108 can be operably associated with the forward inclined surface 38 such that as the tabletop 79 contacts the forward inclined surface, the normally closed valve 106 will open permitting air pressure to pass through line 110 and into the one end of valve 86. The air pressure into the one end of valve 86 causes the spool (not shown) within the valve 86 to permit communication between line 84 and line 88, permitting air pressure to flow at controlled rates through branches 90 and 94 and into the top portions of cylinders 24 and 26 respectively. This causes the piston rods associated with the cylinders to be retracted thereby drawing the abutment 16 downwardly. By this action, the platforms 12 and 14 will rotate in a rolling action on the rounded central portions 62 and 64 respectively. When the abutment 16 is fully depressed, the platforms 12 and 14 will approach vertical thereby vertically raising the table top 79 on its edge in contact with the forwardly inclined surface 38 of abutment 16. As illustrated in FIG. 4, the peak between inclined surfaces 38 and 40 is closer to the platform 14. When the abutment is fully depressed, the wheels 34 next to the inclined surface 38 are at the peak between the inclined surfaces 38 and 40. This relationship between the wheels on platform 14 and the peak causes the tabletop 79 to fall over onto the platform 12 so that it is at least partially supported thereby. In other words, the table top 79 becomes unstable in contact with the platform 14 and with an edge resting on the peak formed between the inclined surfaces 38 and 40, so that the tabletop must rotate in a counterclockwise direction viewed in FIGS. 3 and 4 until its top surface contacts the rollers 34 of the platform 12. As illustrated in FIGS. 3 and 4, the rounded central portion 64 of the guides 44 is positioned with relation to the abutment 16 so that the platform 14 is substantially vertical when the abutment is in the fully depressed position. On the other hand, the guide 62 is spaced a little but farther away from the abutment 16 so that the platform 12 is not as close to the vertical as is the platform 14.

During the inverting operation, the bottom forward edge of the tabletop 79 will contact the inclined surface 38 as the tabletop is raised by platform 14. The core portion of the tabletop will subsequently rest on the peak between inclined surfaces 38 and 40 as the component of force from the table top on abutment 16 increases. In this manner, the force on the laminate at the bottom of the table top 79 is decreased and eventually eliminated. As the table top is supported solely on the abutment 16, the core of the tabletop contacts the peak between inclined surfaces 38 and 40, thereby relieving all pressure on the forward edge of the laminate on the bottom of the tabletop 79. During the downward movement of the tabletop on platform 12, the tabletop will rest on inclined surface 40 with the smooth edge 79a in contact therewith. In this manner, the tabletop is quickly and easily inverted without breaking a forwardly extending laminate on the bottom of the tabletop.

When the abutment 16 is fully depressed, the bottom surface thereof will contact the actuating button 116 for normally closed valve 114. Before contact, valve 106 will be closed. Upon contact, valve 114 will open to permit air pressure to pass through line 118 into the other end of the valve 86. Valve 86 will then switch so that the air pressure then flows through lines 98 and into branches 102 and 100 to the bottom of fluid cylinders 24 and 26 respectively. This action causes upward movement of the piston rods to raise the abutment 16 back to its original position. At the same time, air pressure is exhausted from the top of cylinders 24 and 26 through lines 90, 94, 88 and through valve 86.

When the abutment 16 reaches its original position, the platforms 12 and 14 will reach the position illustrated in FIG. 1 and the tabletop 79 will be in inverted position on table top 12.

Reasonable variation and modification are possible within the scope of the foregoing disclosure, the drawings, and the appended claims without departing from the spirit of the invention.

I claim:

1. An apparatus for inverting planar articles wherein said articles are inverted while protecting the edges thereof from damage, said apparatus comprising:
   first and second platforms in coplanar substantially horizontal relationship;
   abutment means having inclined surfaces forming a peak extending above the general plane of the top surface of said platforms and rotatably coupled to each of said first and second platforms therebetween;
   means for selectively depressing said abutment means and thereby depressing one end of each of said platforms to such an extent that a planar article on said first platform having one edge in contact with said abutment will be raised on said edge on said peak and transferred to said second platform, whereby when said abutment means is returned to its original position, and said platforms return to their coplanar relationship, said planar article will be supported by said second platform in an inverted position.

2. An apparatus according to claim 1 further comprising guide means for each of said platforms to guide movement of each of said platforms about an arcuate path adjacent said abutment means as said abutment means is depressed.

3. An apparatus according to claim 2 wherein each of said guide means comprises a support member bent downwardly in an arcuate path, said downwardly depending portion being spaced from each other.

4. An apparatus according to claim 1 wherein said platforms are formed of a plurality of rollers such that said planar members are freely rotatable on said first and second platforms.

5. An apparatus according to claim 1 wherein said peak is spaced closer to said first platform than to said second platform such that said planar articles on said first platform become unstable when raised on said peak by fully depressing said abutment means, and said planar members fall over against said second platform to be supported thereby.

6. An apparatus according to claim 1 wherein said selective depressing means includes a fluid operated cylinder having a piston rod joined to a bottom portion of said abutment means.

7. An apparatus according to claim 1 wherein said selective depressing means includes means to automatically return said abutment means to said original position after being depressed to a predetermined depth below said original position.

8. An apparatus according to claim 7 wherein said selective depressing means further comprises pressure sensitive means on said abutment means to initiate downward movement of said abutment means when a planar article on said first platform contacts said abutment means.

9. An apparatus according to claim 1 wherein said selective depressing means comprises pressure sensitive means on said abutment means to initiate downward movement of said abutment means when a planar article on said first platform contacts said abutment means.

10. An apparatus according to claim 1 wherein said platforms are supported on a rigid base and stabilizer means are fixed to said base and to said abutment means to maintain the movement of said abutment means within confined limits.

11. An apparatus according to claim 1 further comprising a rigid base supporting said platform, said rigid base including guide means for said platform, said guide means including said support members bent downwardly about an arc, each of said platforms resting on a guide means so that said platforms bear against and follow said guide means in a rolling contact manner about said arc as said abutment means is depressed, said peak being spaced from said first platform such that when said abutment is depressed a given distance, said planar article on said first platform will be supported by said peak and transferred by the force of gravity to said second platform.

12. An apparatus for inverting planar articles such as tabletops and the like from one side to the other, said apparatus comprising:

a platform for supporting a planar article;

an abutment joined to said platform at one side thereof; said abutment having a ridge and an inclined surface to said ridge rising above the general plane of said platform;

means for supporting said platform for movement about an arcuate path as said one side is moved downwardly to orient said platform from a substantially horizontal position toward a vertical position;

means for moving said abutment and thereby moving said platform one side downwardly to such an extent that said planar article supported by said platform and having an edge in contact with said abutment is raised on said edge with said edge supported by said ridge on said abutment; and said platform having means to push said planar article over, thereby rotating said article about said edge when said abutment means is in its lowermost position.